United States Patent [19]

Nussbaumer

[11] 4,147,622

[45] Apr. 3, 1979

[54] PROCESS FOR MANUFACTURING MEMBRANES FOR OSMOTIC SEPARATION

[75] Inventor: Dietmar G. Nussbaumer, Göttingen, Fed. Rep. of Germany

[73] Assignee: Sartorius Membran-Filter GmbH, Göttingen, Fed. Rep. of Germany

[21] Appl. No.: 779,222

[22] Filed: Mar. 18, 1977

[30] Foreign Application Priority Data

May 14, 1976 [DE] Fed. Rep. of Germany ....... 2621519

[51] Int. Cl.² .......................................... B01D 13/00
[52] U.S. Cl. .............................. 210/23 H; 210/23 F; 210/500 M; 264/41
[58] Field of Search ............ 210/500 M, 321 R, 23 H, 210/23 F; 264/41, 49

[56] References Cited

U.S. PATENT DOCUMENTS

| | | | |
|---|---|---|---|
| 3,497,072 | 2/1970 | Cannon | 210/500 M |
| 3,846,404 | 11/1974 | Nichols | 210/500 M X |
| 4,026,978 | 5/1977 | Mungle et al. | 210/500 M X |

Primary Examiner—Frank A. Spear, Jr.
Attorney, Agent, or Firm—Browdy and Neimark

[57] ABSTRACT

An asymmetrical permselective cellulose triacetate membrane has outstanding properties for desalination of seawater by reverse osmosis. It is made by casting a solvent solution of the cellulose triacetate in a solvent mixture of at least 40% acetone, a solvent for the triacetate and a swelling agent for the triacetate. The swelling agent, preferably formamide, must be added as the last component of the solution. After exposing the cast solution to evaporation for 2–90 seconds, it is precipitated in cold water, and then optionally tempered at 50°–100° C. in water which may contain a modifying agent, and dried.

40 Claims, 2 Drawing Figures

MEMBRANE CHARACTERISTICS AS A FUNCTION OF ACETIC ACID CONTENT OF THE TEMPERING BATH (3.5% NaCl, 105 BARS)

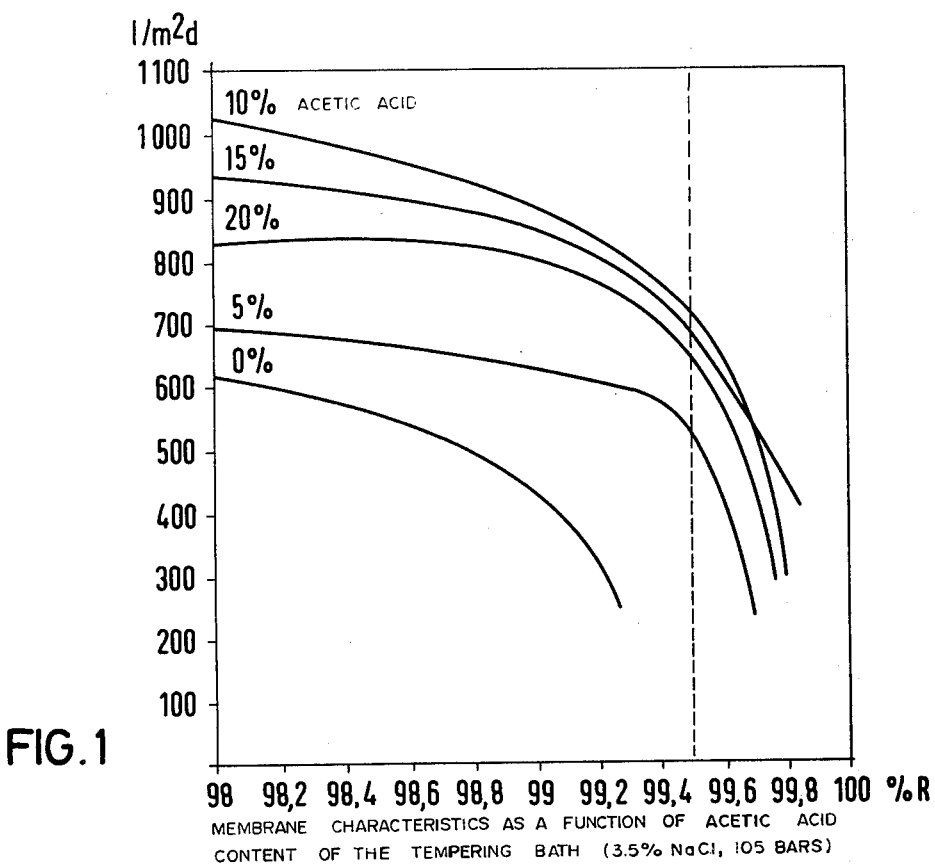
FIG.1 MEMBRANE CHARACTERISTICS AS A FUNCTION OF ACETIC ACID CONTENT OF THE TEMPERING BATH (3.5% NaCl, 105 BARS)
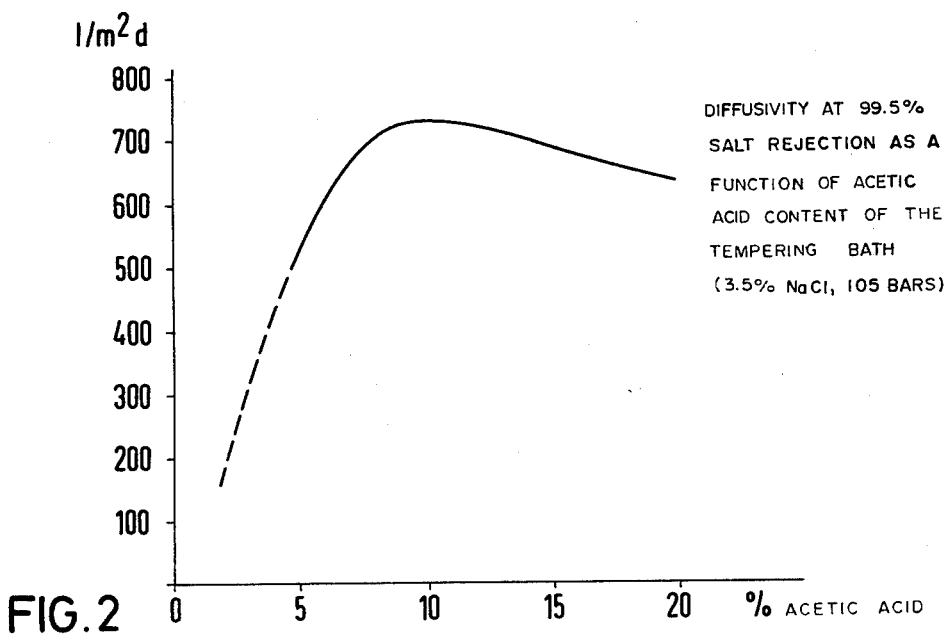
FIG.2 DIFFUSIVITY AT 99.5% SALT REJECTION AS A FUNCTION OF ACETIC ACID CONTENT OF THE TEMPERING BATH (3.5% NaCl, 105 BARS)

PROCESS FOR MANUFACTURING MEMBRANES FOR OSMOTIC SEPARATION

FIELD OF THE INVENTION

The present invention relates to a process for manufacturing membranes for osmotic separation, especially membranes for selective diffusion of one solution component. The invention also relates to such membranes as well as their use for reverse osmosis, especially for desalination of seawater and brackish water.

BACKGROUND OF THE INVENTION

There are many membranes which to a certain degree possess the property of being selectively permeable to various components of solution mixtures. Thus, for example, certain membranes exhibit retentivity toward ions, while allowing water to pass through. Other membranes have selectively different diffusion rates for two or more different nonionic components, while still other membranes are of the so-called molecular sieve type. Such properties are widely applicable, for example for recovering water from saline solutions, as in the desalination of seawater, water softening or purification of wastewater, recovery of small amounts of dissolved or colloid-disperse substances from solutions, concentration of solutions or dispersions, or separation or purification of macromolecular or colloidal materials from solutions which contain contaminants with low molecular weights. In the latter case, for example, the purification of blood and use in artificial kidneys are especially well-known examples.

An area of application which is particularly important for industrial technology is the desalination of seawater and brackish water to obtain drinking water. Membranes made of completely synthetic polymers, especially polyamide hydrazide membranes, membranes made of mixtures of cellulose diacetate and triacetate, as well as multilayer membranes composed of a cellulose ester carrier membrane coated with cellulose triacetate, have been proposed and used. Seawater contains approximately 35,000 ppm dry substance and/or salt; drinking water may contain a maximum of 500 ppm of salt. In order to clean water sufficiently in one pass through the membrane, a theoretical salt rejection (R) of 98.6% would be necessary. In practice, however, due to certain invariable loss factors, a salt rejection (R) of 99.5% is required. Salt rejection R, however, is not the sole criterion for such a membrane. The membrane must also exhibit satisfactory diffusivity (D) in order to be technically usable. The lower economic limit is $D = 400$ liters/m$^2$/day.

Known membranes mostly suffer from the fact that they have excessively low diffusivity and high salt rejection or *vice versa*. German Auslegeschrift No. 15 70 163 (Loeb) teaches an acetate membrane, but it does not have sufficient diffusivity. By way of improvement, German Auslegeschrift No. 21 15 969 teaches membranes made of cellulose-2,5-acetate, which have a diffusivity of 100 liters of water per m$^2$ of membrane surface in 24 hours for salt water with an NaCl content of 5000 ppm (0.5%), while the salt content of the water which has passed through is still 600 ppm (0.06%), (R = 88%). With higher salt rejection, in order to obtain a permeate with 100 ppm (0.01%), (R = 98%) of salt, diffusivity is only 40 liters per m$^2$ per day. Hence, the permeate must be passed repeatedly through a membrane in order to achieve sufficient desalination; in other words, it must operate in a "multistage" mode. Therefore, it has been stated, for example, in a publication (4th International Symposium on Fresh Water from the Sea, Vol. 4, 285–295, 1973) that by using known membranes, only brackish water with a salt content of approximately 1% can be turned into drinking water. With higher initial concentrations, either the efficiency, i.e., the diffusivity or the retentivity (salt rejection) of the membranes is too low.

Single-stage seawater desalination is more economical, however, than the multistage type and would therefore be of greater engineering significance.

In engineering applications, cellulose diacetate is used, although it is well known that cellulose triacetate should theoretically be better suited for desalination (Riley et al., 3rd International Symposium on Fresh Water from the Sea, Vol. 2, 551–560, 1970). It has the advantage of greater resistance to hydrolytic and biological attack than diacetate. The importance of resistance to hydrolysis becomes apparent in view of the fact that the pH of sea-water is approximately 8.5, and diacetate membranes can only be used following acidification to pH 6. The necessity of prepariing, storing, and dispensing sulfuric acid is especially disadvantageous when the point at which it is to be used is remote. Thus, in an intensive trial of alkaline hydrolysis at ph 11.5 and 50° C., a triacetate film shows a decrease in acetyl content (based on 100% acetyl content in the original material) to only 37.9% after 4 hours, while a diacetate film shows a decrease in acetyl content from 100% to 5.8%.

However, it has thus far been possible only to use cellulose triacetate mixed with cellulose diacetate in so-called mixed membranes (membranes of the blend type) or as a thin coating layer on multilayer membranes. The latter are very costly to manufacture, however.

The production of a skin layer with cellulose triacetate has so far been unsuccessful because cellulose triaceate is difficult to work with, soluble only in a few solvents, and the solutions have high viscosity. Moreover, it is known (German Auslegeschrift Nos. 15 70 163 and 21 15 969) that membranes made of higher-substituted acetate are much less permeable than those made of diacetate, so that the diffusivity is too low. The desalination efficiency of cellulose acetate admittedly increases with the degree of acetylation (Riley, et al.), but the permeability to water decreases markedly as well. One consequence of the low permeability of cellulose acetate in general to water, therefore, is the requirement for an extremely thin, active layer (skin layer) with the membranes to achieve efficient diffusivity.

Conventional membrane filters made of cellulose diacetate do not exhibit any useful desalination properties and must therefore be tempered in water at 70°-90° C. Tempering, however, results in a significant decrease in diffusivity. Direct to of this tempering process for diacetate in water in triacetate membranes has not yet been possible.

So-called integral membranes, in other words, membranes made of only one layer, but one which is sufficiently thick to be easy to handle, would be much more satisfactory than multilayer membranes, however. Integral membranes are simpler to manufacture. They can be prepared essentially in a single casting from only one homogeneous material. Owing to the density of triacetate membranes, which does not allow sufficient diffusivity, and owing to the additional difficulty that no success has yet been achieved in tempering triacetate membranes to improve their properties sufficiently, no integral triacetate membranes have yet been used.

The membrane filter most widely used at present, as mentioned above, is a diacetate filter, made by the so-called Loeb method. Experiments aimed at transferring the Loeb method to cellulose triacetate have yielded unsatisfactory results. Skiens and Mahon (German Offenlegungsschrift No. 19 23 187) and J. Appl Poly. Sci., Vol. 7, 1549 (1963) achieved a diffusivity of 57 liters/m$^2$/day with a salt rejection of 92.5% (on the basis of 1% NaCl) (48.9 bars). The most satisfactory results described in the literature (Saltonstall, 3rd Internation Symposium on Fresh Water from the Sea, Vol. 2, 579–586, (1970)) with triacetate membranes indicate diffusion of 180 liters/m$^2$ and salt rejection of 98.7% with an initial salt concentration of 3.5% NaCl and 105 bars pressure differential. The membranes were drawn from acetone/dioxane with methanol and maleic acid additives; it is also claimed that mixtures of diacetate and triacetate are preferable to the pure components. In contrast to the Loeb method, for example, cellulose triacetate membranes can also be manufactured by melt extrusion with sulfolane and polyethylene glycol. However, unsatisfactory results have resulted from using this procedure (Davies et al., ACS Polym. Prepr., 12, (2), 378 (1971)).

All of the membranes described thus far, made of pure cellulose triacetate, are inferior to Loeb membranes based on cellulose diacetate.

The principal difficulty regarding triacetate is the limited choice of solvents and the very high solution viscosities in the required concentration range (14–18%). These become particularly evident when, by analogy with known processes, one of the highly volatile water-miscible solvents (dioxane, tetrahydrofuran) is used instead of acetone.

The only principal component of all known casting solutions for manufacturing cellulose acetate membranes of the Loeb type that has been found satisfactory thus far is acetone. The use of large amounts of acetone appears to be a prerequisite for the Loeb method.

Since cellulose triacetate is insoluble in acetone, other solvents must be added to cellulose triacetate casting solutions. The amounts required for this purpose are a function of the degree of polymerization of the triacetate; the higher the molecular weight, the more actual solvent required (e.g. dioxane, dimethyl sulfoxide). According to a known method, dioxane:acetone ratios much larger than 1:1 are used (King, Hoernschemeyer and Saltonstall in "Reverse Osmosis Membrane Research", Plenum Press, New York-London, 1972, p. 148).

SUMMARY OF THE INVENTION

Accordingly, it is an object of the present invention to provide an improved selectively permeable membrane.

It is a further object to provide a method for making an improved selectively permeable membrane.

It is another object to eliminate the problems encountered in the prior art as discussed above.

It is still another object to provide a method for making selectively permeable membranes consisting substantially of cellulose triacetate.

It is yet another object of the present invention to provide for greatly improved efficiency in seawater desalination as well as other separation processes.

In accordance with the present invention, it has been found that it is quite possible to manufacture asymmetrical integral membranes from cellulose triacetate under certain conditions, and to temper them as well if desired. Such membranes can be used for various low-pressure processes (for example, softening water or concentrating sugar) in the untempered state. A certain tempering process can enable them to be used for single-stage seawater desalination.

Hence, the subject of the present application is a process for manufacturing cellulose triacetate membranes by casting solvent solutions to form a thin layer on a smooth substrate, exposing them in order to evaporate volatile solvent components, precipitating the membrane in water, and then tempering it if necessary, which consists of dissolving cellulose triacetate of low molecular weight in a mixture of solvents, consisting at least of 40% acetone, a solvent for triacetate, especially dioxane or dimethyl sulfoxide, and a swelling agent for triacetate, especially formamide, wherein the swelling agent for the triacetate solution must be added as the last component. This is followed by tempering if required.

Instead or additionally to formamide other fatty acid amides with up to 4 carbon atoms, i.e. acetamide, propionamide and/or butyramide may be used as swelling agents. Formamide is preferred and thus is used in the preferred embodiments.

It is surprising that the fact that formamide or other swelling agent is added last is of considerable importance for the quality of the membranes.

It should be understood that, by the term "tempering" as used in the present specification and claims is meant heating the membrane to the specified temperature, usually in water to which additives may have been added, as specified.

BRIEF DESCRIPTION OF THE DRAWINGS

FIG. 1 is a graph showing the diffusivity vs. rejection curves of a membrane in accordance with the present invention as a function of acetic acid content of the tempering bath.

FIG. 2 is a graph showing the diffusivity at 99.5% salt rejection as a function of acetic acid content of the tempering bath.

DETAILED DESCRIPTION OF PREFERRED EMBODIMENTS

In the present invention, those varieties of triacetate are used whose viscosity, measured as a 2% solution in methylene chloride/methanol 9/1, measured according to Hoeppler at 25° C., amounts to a maximum of 10 cp. Viscosities of approximately 7.5 cp to 10 cp are very suitable. The acetyl content is usually at least about 43%, especially 43.5% or more. Pure triacetate would have an acetyl content of 44.8%, but this is hardly ever attained in practice. Types T 900 and T 700 made by Bayer are very suitable, for example. Triacetate can be mixed with up to 30% (based on CTA) of diacetate.

The triacetate concentration in the casting solution can generally be between 12 and 20%, but is preferably 14–18%. The swelling agent (preferably formamide) content of the final solution can be 5–15% based on the total mixture, but preferably amounts to 8 to 12%, wherein a maximum ratio of 1:1, based on the polymer, is not exceeded. The useful ratio is between 0.5:1 and 0.75:1, and the preferred ratio is between 0.6:1 and 0.65:1. The optimum is about 10% formamide in the total mixture.

The ratio of formamide to polymer should advantageously be kept constant. If the polymer concentration changes, the formamide concentration should be changed as well.

As mentioned earlier, the casting solution contains more than 40% acetone, based on the total mixture, but preferably more than 50% acetone. The ratio of acetone to the actual solvent, e.g., dioxane, is 1.1:1 to 17.5:1, but preferably 1.25:1 to 2.5:1, especially 1.75:1 to more than 3:1. When dioxane is used as the solvent, the ratio is advantageously 1.75 to 2.25:1, the optimum being approximately 2:1. When DMSO is used as the solvent, the ratio is preferably 2:1 to 3:1. The amount of acetone plus solvent, e.g., dioxane, is approximately 70 to 80% of the total mixture, with the rest consisting of triacetate and formamide.

When DMSO is used as the solvent, the casting solution can be modified, if desired, if the preparation of the solutions is undertaken at temperatures significantly below 0° C. If the CTA solutions are prepared at temperatures of −10° to −40° C., preferably at −15° to −25° C., e.g., at −20° C., it will suffice to use 2 to 6%, preferably 3 to 5% DMSO, with the optimum being approximately 4%, when CTA solutions are prepared at room temperature, however, it is advantageous to use approximately 20% DMSO, based on the total mixture and/or the total casting solution. Preferably, it is stored and processed at room temperature.

When casting solutions by machine, the preferred layer thickness after casting is approximately 300 microns, it being especially preferred to maintain an atmosphere containing solvent vapor about the casting machine and the cast film. The solution can also be spread on glass plates, for example using a spreader with a 300 micron slot. The exposure times used in practice, in other words the time between casting and precipitation in water, are up to 45 seconds; especially when dioxane is the solvent, evaporation times of 2–30 seconds and particularly 5–15 seconds are preferred, if there is to be no subsequent tempering, and no atmosphere containing solvent vapor is present above the cast membrane. If the atmosphere above the cast membrane is partially saturated with solvents, or work is being carried out at temperatures below room temperature, evaporation times can be increased, and can be as long as 90 seconds, although times up to approximately 45 seconds are preferred in this case.

The precipitation temperature is 0° to 1° C., e.g. ice water. It has been found advantageous, especially when dioxane is present in the casting solution as a solvent, to use solutions for casting which have been aged for 12 to 72 hours, particularly 12–48 hours, and preferably for 24 hours. Casting is not performed at temperatures above room temperature, wherein the variations known to experts must be taken into account. We have already mentioned in conjunction with the preparation of the solutions that as far as the addition of the solvent components is concerned, the swelling agent, in other words formamide, must always be added last.

Aging the casting solution increases salt rejection, which reaches a maximum when the solution is aged 1 to 2 days. In addition, the diffusivity is increased by aging.

One of the features of the known Loeb membrane is tempering in pure water at temperatures below the boiling point of water. No success has been achieved so far in tempering cellulose triacetate membranes in water with improvement of their characteristics. It has been found, however, that membranes manufactured according to the present invention lend themselves to improvement of their properties by tempering, and this effect can be made even more pronounced by using certain additives. While tempering of cellulose diacetate membranes at temperatures of 50° C. or more leads to a decrease in diffusivity, which is very steep and nearly linear in the 75° to 95° C. range, but does result in a pronounced increase in salt rejection, membranes according to the invention, when tempered in pure water, exhibit a nearly constant membrane constant between approximately 25° and 75° C. This is extremely surprising. In the case of membranes made of cellulose diacetate, the reduction in diffusivity is taken into account, since they only become effective for desalination when tempered in water of 70°–85° C. Triacetate membranes, on the other hand, are desalination-effective *per se*, and this effectiveness can be increased even further in membranes according to the present invention by tempering.

Membranes according to the present invention, which contain slight additives of diacetate (up to maximum of 30%), can be tempered like Loeb membranes, but also exhibit the much improved behaviour of pure triacetate membranes. The preferred temperatures for tempering the membranes in accordance with the present invention are 50°–100° C., preferaboy 70°–100° C. when no modifier is used and 60°–100° C. when a modifying agent, as discussed below, is used.

According to preferred embodiments, the casting solutions can also contain up to 20% of a low carboxylic acid or up to 10% of a low oxycarboxylic acid or dicarboxylic acid ($C_1$–$C_4$).

The following examples illustrate the invention:

EXAMPLE 1

The following casting solution was prepared:
16% cellulose triacetate (T 700, Bayer)
24% dioxane
50% acetone
Finally, 10% formamide was added to this solution.

The membranes were prepared according to the method known since the introduction of the Loeb membrane, by spreading on glass plates using a spreader used for thin-layer chromatography (Desaga brand): Slot = 300 microns.

Exposure at room temperature (to evaporate solvents): 30 sec. 0°

Precipitation by means of vertical mounting of the plates in distilled water, 0° to 1° C.

For comparison, the classic cellulose diacetate membrane of Loeb-Manjikian was prepared according to the literature and tested under identical conditions; the casting solution had the following composition:

Comparison Example:

20% cellulose diacetate (E 398-3, Eastman Kodak)
30% formamide
45% acetone

The preparation otherwise was as described above.

The membrane obtained according to the present invention, after tempering performed for 2 min in water with 5% diacetin, showed a diffusivity of approximately 600 liters/m$^2$/d at R=99.6, while the Loeb membrane, with 400 liters/m$^2$/d, had an R of 92.25.

EXAMPLE 2

The same casting solution as in Example 1 was drawn on a laboratory casting machine. The conditions were as follows:
Casting solution: Same as in Example 1
Slot: 250 microns
Speed of revolution of the casting drum: 0.5 rpm.
Exposure time in air: 45 sec.
Air feed: 27 liters/min
Precipitation bath: deionized water with addition of 0.01% wetting agent (Monflor 51, ICI) 1° C.

In this manner, membranes could be obtained which had R=99.75 at D=400, or R=99.5 at D=650.

EXAMPLES 3 to 8

The examples show a number of casting solutions as well as data on several of the membranes produced in this fashion.

The casting solution was spread either in a room atmosphere or (with a controlled casting atmosphere) in a glove box using a Camag thin-layer spreader, on glass plates 200×200 mm. After a specified evaporation time, the plates were mounted vertically in the precipitation bath (distilled water, 1°–2° C). In the case of drawing in a room atmosphere, the cooling agent bath of a Lauda ultracryostat was used; otherwise, the precipitation baths were located in the glove box.

3.

18% T 900
18% DMSO
10% formamide*
54% acetone
viscosity: 17,800 cp ($\eta_{rel}$ = 24,300)
DMSO/acetone - 25/75
FOOTNOTE: *This component must be added to the prepared solution.

4.

18% T 900
26% DMSO
46.2% acetone
3.8% maleic acid
6% methanol
viscosity: 21,000 cp
DMSO/acetone = 36/54

5.

18% T 900
27.7% DMSO
44.5% acetone
9.8% lactic acid*
viscosity: 24,500 cp
DMSO/acetone = 38/62
FOOTNOTE: *This component must be added to the prepared solution.

6.

18% T 900
20% DMSO
20% formic acid
2% maleic acid
40% acetone

7.

1.8% E 398-3
16.2% T 900
20% DMSO
20% formic acid
42% acetone

The mixture therefore contains 10% diacetate, based on polymer.

8.

20% T 900
20% DMSO
3% formic acid
57% acetone

The following table shows some data on membranes produced in this fashion.

| Casting solution Example | t (sec) | A.$10^5$ | Tempering (° C.) | $R$NaCl (%) | D (lm$^{-2}$ . d) |
|---|---|---|---|---|---|
| 6 | 30 | 10.0 | 76 | 8.0 | 2800 |
| Treated with formamide before tempering: | | | | 99.0 | 302 |
| 7 | 30 | 7.5 | 76 | 97.6 | 483 |
| Treated with formamide before tempering: | | | | 98.52 | 952 |
| 8 | 15 | 15.3 | 76 | 12.5 | 3360 |
| Treated with formamide before tempering: | | | | 99.3 | 445 |

NaCl rejection and diffusivity (0.5% NaCl, 100 bars)

EXAMPLE 9

The use of a new solvent system, namely acetone/dioxane 2/1+10% formamide, resulted in a membrane that also lent itself to special tempering. After tempering, the membrane provided diffusivities of approximately 600 liters/m$^2$.d at R=99.6%. A membrane prepared in this fashion exhibited a salt rejection of 99.5% when exposed to 3.5% NaCl solution and 105 bars, with a diffusivity D of approx. 700 liters/m$^2$.d, at the critical diffusivity of 400 liters/m$^2$.d it exhibited a salt rejection of 99.8%. For comparison, under the same conditions, a Loeb membrane, in other words the best type of membrane currently in use, at D=400 showed R=99.25, and could only reach R=99.45 even at diffusivities below 300 liters/m$^2$.d. It was tempered in water containing 5 to 7% diacetin at 70° to 100° C.

EXAMPLE 10

Casting solution:
16% T 700
71% acetone
3% dimethyl sulfoxide
10% formamide

The polymer was dissolved in the acetone-dimethyl sulfoxide mixture at a temperature of −30° C. Formamide was added after warming up the solution to room temperature. The membranes were produced in the same manner as described in example 1.

Different to the casting solution containing dioxane almost clear membranes were obtained, probably due to a finer understructure. After tempering in 15% acetic acid at 62° C. a flow rate of 700 l/m$^2$d and a salt rejection of 99.5% were measured (3,5% NaCl, 105 bar).

EXAMPLE 11

Casting solution:
14% T 700
28% acetone
28% dioxane
15% formamide
15% acetamide

The membranes obtained by hand, as described in example 1, exhibit no rejection capacity for low molecular substances and thus are suitable as ultra filtration membranes.

When filtering a 0.1% solution of a protein-preparation in physiological salt solution in a stirred ultra filtration cell at 1 bar the following results have been achieved:

|  | Serum albumin (MW = 6700) | Myoglobin (MW = 1800) | Cytrochrome C (MW = 12000) |
|---|---|---|---|
| Rejection-capacity (%) | 100 | 99 | 45 |
| flow rate (l/m²h) | 142 | 125 | 192 |

The flow rate of pure water was 200 l/m²h at 1 bar.

EXAMPLE 12

Casting solution:
11.2% T 700
2.8% E 398-3
28.0% acetone
28.0% dioxane
30.0% formamide The casting solution was drawn on a laboratory casting machine under the conditions described in example 2. Tests done as shown in example 11 gave the following results:

|  | Serum albumin | Myoglobin | Cytrochrome C |
|---|---|---|---|
| Rejection-capacity (%) | 100 | 100 | 69 |
| flow rate (l/m²h) | 159 | 109 | 175 |

The flow rate for pure water amounted to 210 l/m²h.

It is possible to prepare CTA membranes for desalination of brackish water according to a simplified process, selecting extremely short evaporation times.

EXAMPLE 13

Casting solution:
16% T 700 (Bayer)
50% acetone
24% dioxane
10% formamide

The solution was spread using a spreader with a 300 micron slot on glass plates (200×200 mm). After different evaporation times, the plates were immersed in ice water.

Surprisingly, it was found that short evaporation times produced membranes that exhibited high desalination capacity even in the untempered state.

It is therefore particularly interesting that precisely those membranes which exhibit significant salt rejection in the untempered condition are less prone to further improvement by tempering than those which had lower rejection values originally.

The following comparison between the characteristics of untempered and tempered membranes for different evaporation times should make this relationship more clear.

| Evaporation time (sec) at room temperature | Untempered (tested with 0.5% NaCl at 41 bars) | | Tempered with 5% glycerol diacetate in water at 74° C (tested with 3.5% NaCl at 105 bars) | |
|---|---|---|---|---|
|  | D(l/m²d) | R(%) | D(l/m²d) | R(%) |
| 5 | 1240 | 96.2 | 575 | 98.54 |
| 15 | 1470 | 95.1 | 585 | 99.28 |
| 30 | 1725 | 87.7 | 580 | 99.48 |
| 45 | 2375 | 20.2 | 480 | 99.56 |

The values in the tables show that this process can be used to advantage with evaporation times for untempered brackish-water membranes of less than 5 to 30 sec, namely at 2 to 30 sec, while 5 to 15 sec are preferably employed.

As mentioned hereinabove, the same effect can be achieved by reducing the evaporation rate, e.g., by lowering the temperature or by partial saturation of the atmosphere with solvent, even at longer evaporation times.

The membranes according to the present invention may be tempered. A specific method of tempering is heating the CTA membrane in water containing up to 20% of a water-soluble organic ester, or of an alkane or alkene carboxylic acid, or a lactone, formamide, such as dimethylformamide, dioxane or a low ketone, with a total of up to 5 carbon atoms, preferably 3–5 carbon atoms, or up to approximately 45% of a monovalent $C_1$–$C_4$ alcohol, for a period of several minutes, especially two minutes, at 50° to 100° C., preferably 60° to 100° C., and then if desired subsequently treating in a known fashion with a mixture of glycerol and water and drying. If the membrane contains diacetate, it can be tempered immediately with pure water. The tempering time is preferably 2 min, but can also be up to 5 min.

According to one variation, the membrane is first subjected to treatment with formamide for several minutes, especially approximately 5 minutes, and then tempered for several minutes in water at 50° to 100° C., especially 75° to 95° C. In this case, therefore, the water does not contain any additives.

While pretreatment for subsequent tempering in pure water appears to be a specific effect of formamide, the other variant, namely tempering in water which contains a modifier, is highly variable as far as this modifier is concerned. Advantageously, low alkane or alkene carboxylic acids, esters of the latter, which preferably contain up to 5 carbon atoms in the alkane or alkene part or in some cases also in the ester part, or $C_1$–$C_4$ alcohols are used wherein $C_2$ compounds are preferably in the acid and ester residue. Acetic acid and diacetin are particularly preferred. The effectiveness in decreasing order is as follow: 2% glycerol triacetate, 5% glycerol diacetate, 10% acetic acid and 40% ethanol; the latter two are approximately equivalent. A special compound that could be mentioned is sulfolane, but it is one which acts only when tempering is carried out above 70° C. and when working with membranes prepared according to the invention which are free of plasticizer and polyol.

A membrane to be treated with sulfolane must contain a maximum of up to about 12% swelling agent, but the latter must be largely removed during tempering.

The preferred amounts of modifier in the water are 2 to 10%, particularly for the esters, carboxylic acids, lactones, formamides and sulfolane. The upper limit for sulfolane, diacetin, and triacetin can be up to 15%, but an amount of 2 to 10% is preferred in this case. This is surprising, since, for example according to German Offlenlegungsschrift No. 1,923,987, in the case of triacetate membranes, which are extruded and already contain a plasticizer, subsequent treatment involves using a plasticizer solution, containing 65 to 60% by weight of sulfolane and 75 to 40% by weight of water in the case of desalination membranes. The processing temperature is 20° to 40°C. However, this yields salt rejections of only 90 to 98% and, as mentioned above, diffusivities of up to 100 liters/m².d. With tempering according to the invention, on the other hand, processing temperatures below 50° C. are practically ineffective. In the case of $C_1$–$C_3$ alcohols, 35 to 40% has proven effective, in the case of $C_4$ butanol, saturation in water is preferred.

It is possible to prepare triacetate membranes in this manner which have a diffusivity of a good 600 liters/m².d and a salt rejection of 99.5%, which makes possible their use for single-stage seawater or brackish-water desalination.

The membrane prepared according to the present invention from solutions at room temperature (i.e., especially dioxane-containing solutions and tempered if desired), can also be dried without pretreatment, which is known to be impossible in the case of Loeb membranes, because they would otherwise become completely impermeable. In the case of Loeb membranes, they must be dipped in at least 30% glycerol in order to fill the pores with glycerol so that they can be dried. They then become opalescent because of the glycerol filling. In the case of the membranes according to the present invention cited hereinabove, it is sufficient to immerse them in water in a mixture of 10% glycerol in water, so that they can the be dried without any loss of diffusivity, whereby there is likewise no reduction of salt rejection. This is particularly true of tempered membranes. In the present case, less glycerol is used than in the Loeb method for example, since it is unnecessary to fill the pores, owing to the special structure of the asymmetrical integral membrane according to the present invention, provided the latter is drawn from solutions containing dioxane, in other words, not like the membranes that are drawn from solutions with a low DMSO content. The coarse structure of the new membranes is most understanding in those membranes that are drawn from solutions containing dioxane. This special structure makes it possible to fill the pores with air when drying with or without glycerol, since most of the membrane contains coarse pores. The new, possibly tempered membranes drawn from acetone/dioxane or acetone/DMSO systems do lose some diffusivity when dried without glycerol, but they are in no way rendered useless. The decrease in diffusivity is barely 50% and rejection is changed hardly at all, while in the case of drying after treatment with glycerol/water (10/90) there is practically no change in diffusivity and rejection.

The following examples illustrate tempering.

EXAMPLE 14

A cellulose triacetate membrane was prepared from the casting solution according to example 13. After preparation, i.e., in the untempered state, it showed a diffusivity of 3000 liters/m².d and a salt rejection R of 32% (3.5% NaCl, 105 bars)

Following tempering in pure water at 90° C., the wet tempered membrane still showed a diffusivity of 300 liters at a salt rejection of 98.5%, while the membrane tempered in 5% diacetin at 74° C. showed a diffusivity of close to 700 liters/m².d with 99.5% salt rejection; these figures refer to 0.5% magnesium sulfate and 41 bars. At 3.5% NaCl and 105 bars the membranes tempered with 5% diacetin with R=99.5% had a D=500 on the average, the membrane tempered with 6% diacetin at R=99.5% had a D = appx. 500, and the membrane tempered with 7% diacetin had a D=450 at R=99.5%.

In the following table, we have summarized additional values for tempering of the same membrane at 74° C. in water, containing 10% of the additives listed (3.5% NaCl, 105 bars):

| Additive | D(l/m² . d) | R(%) | Effect |
|---|---|---|---|
| Untempered | 3000 | 32.0 | |
| Water | 1610 | 81.0 | |
| Methylglycolacetate | 229 | 99.2 | + |
| Triglycoldiacetate | 411 | 99.38 | + |
| Formic acid | 855 | 98.1 | + |
| Propionic acid | 368 | 99.1 | + |
| Lactic acid | 1054 | 95.9 | + |
| γ-butyrolactone | 477 | 99.47 | + |
| dimethylformamide | 1121 | 94.7 | + |

Similar tests were performed with 10% diacetin, triacetin, and acetic acid. These compounds yielded better results; the same is true for sulfolane with the limitations mentioned above. Interestingly enough, polyglycols, which are excellent plasticizers for triacetate, provide no improvement.

The following conditions were preferred for tempering sulfolane in an amound of 5 to 10%, and most preferably 10%, based on water; acetic acid, preferably 5 to 20%, and most preferably 4–6%, diacetin, preferably 5 to 15%; triacetin, preferably 2 to 10%; monovalent $C_1$–$C_3$ alcohols, up to 45% and preferably 30–35%; butanol at saturation in water; and dioxane, as well as $C_3$–$C_5$ ketones, 5–105.

FIG. 1 shows the diffusivity-rejection curves which can be achieved as a function of the acetic acid content of the tempering bath, with tempering temperatures between 55° and 98° C., using a membrane prepared according to Example 15. In example 15, the values for D and R are given before and after tempering.

The evaporation time for preparing the membrane was 30 seconds.

It is clear from this figure that a salt rejection of 99.5%, even with a 5% addition of acetic acid to the tempering bath, can be achieved. FIG. 2 shows that an acetic acid concentration of about 10% is the optimum, if the diffusivity at 99.5% salt rejection is used as the optimization criterion.

The triacetate membranes produced according to the present invention can always be used as ultrafilters and hyperfilters without tempering. Even at less than 7 atm, they can be used for example in wastewater-poor processing technology such as the galvanizing, paper, leather, dyeing, dairy, or textile industries, in other words, in all processes where there is a great deal of wastewater which must be purified and can be recycled or released in a highly-purified state into tributaries, but can also be used for water softening an protein concentration. In a pressure range of 3 to 5 atm, for example, they work very well, so that it is possible to use them for applications in the home, since their rejection value for total hardness is 85 to 99%. The tempered membrane shows a rejection value from 98 to more than 99.5%, making it suitable for single-stage sewater and brackish-water desalination.

The triacetate membranes according to the present invention have still another advantage, namely, they will work even at high temperatures, for example at a feed-water temperature of 50° C. This is very important in hot countries, where it is hardly possible to keep water at 25° C. or less while it is being processed, without cooling it. While the best membrane according to the state of the art, the Loeb membrane, shows a nearly linear decrease in diffusivity and salt rejection with increasing operating temperature as a function of time, salt rejection of triacetate membranes remains higher at higher operating temperatures and increases with the length of the high-temperature operation, and the diffusivity shows only a slight initial drop.

It will be obvious to those skilled in the art that various changes may be made without departing from the scope of the invention and the invention is not to be considered limited to what is shown in the drawings and described in the specification.

I claim:

1. A process for manufacturing asymmetrical selectively permeable cellulose triacetate membranes with a skin layer on at least one side of the membrane, comprising:
casting a low-molecular cellulose triacetate, having a viscosity, measured as a 2% solution in methylene chloride methanol 9:1, at 25° C., of a maximum of 10 cp and having an acetyl content of at least about 43%, dissolved in a mixture of solvents, to form a membrane, said solution consisting essentially of at least 50% acetone, a solvent for the cellulose triacetate, and a swelling agent for the cellulose triacetate, whereby the swelling agent is added to the solution as the last component, the concentration of the triacetate in the solution being 12-20%, and the swelling agent 5-15%, and the ratio of acetone to solvent being at least 1.25:1;
exposing the cast membrane to evaporation for 2 to 90 seconds; and
precipitating in cold water of room temperature or below.

2. A process in accordance with claim 1 further including the step of tempering the cast membrane in water at 50° to 100° C. after said precipitating step.

3. A process in accordance with claim 2 wherein said tempering water has a modifying agent therein.

4. A process in accordance with claim 3 wherein the tempering temperature is 60°-100° C.

5. A process in accordance with claim 4 wherein said tempering step is performed in water containing up to 15% sulfolane.

6. A process in accordance with claim 4 wherein said modifying agent in said tempering water comprises a water-soluble ester, an alkane or alkene carboxylic acid or a lactone thereof or formamide saturated in said water up to 20%, a monovalent $C_1-C_3$ alcohol in the water up to 45%, butanol saturated in the water, dioxane or $C_3-C_5$ ketone up to 20% in the water, or sulfolane up to 15% in the water.

7. A process in accordance with claim 6 wherein said ester, or said acids or their lactone contain up to 5 carbon atoms in the alkane or alkene part and/or in the ester residue.

8. A process in accordance with claim 6 wherein the concentration of said modifying agent in the tempering water is 2-10% for said esters, carboxylic acids, lactones, formamides or sulfolane, 5-10% for dioxane and $C_3-C_5$ ketones, 30-45% for $C_1-C_3$ alcohols and saturation for butanol.

9. A process in accordance with claim 6 wherein said modifying agent is acetic acid or diacetin.

10. A process in accordance with claim 9 wherein the concentration of said acetic acid is approximately 10% or the concentration of said diacetin is approximately 4-6%.

11. A process in accordance with claim 2 wherein said tempering water is substantially pure water and the tempering temperaure is 70°-100° C.

12. A process in accordance with claim 11 further including the step of pretreating the formed membrane in formamide after said precipitating step and prior to said tempering step in pure water.

13. A process in accordance with claim 2 further including the step of treating the cast membrane with glycerol and water following said tempering step.

14. An asymmetrical selectively permeable cellulose triacetate membrane prepared in accordance with the process of claim 13.

15. An asymmetrical selectively permeable cellulose triacetate membrane prepared in accordance with the process of claim 2.

16. In the process of single-stage seawater desalination by reverse osmosis using a selectively permeable membrane, the improvement wherein said membrane is the membrane of claim 15.

17. A process in accordance with claim 2, further including the step of drying the formed membrane following said precipitating step.

18. An assymetrical selectively permeable cellulose triacetate membrane prepared in accordance with the process of claim 17.

19. In the process of single-stage seawater desalination by reverse osmosis using a selectively permeable membrane, the improvement wherein said membrane is the membrane of claim 18.

20. A process in accordance with claim 1 further including the step of treating the cast membrane with glycerol and water following said precipitating step.

21. A process in accordance with claim 20 wherein said treating step comprises immersing the cast membrane in 10% aqueous glycerol.

22. A process in accordance with claim 1 wherein said precipitating water is ice water at 0°-1° C.

23. A process in accordance with claim 1 wherein said cellulose triacetate in said solution contains up to 30% of its weight of cellulose diacetate.

24. A process in accordance with claim 1 wherein said solvent for the cellulose triacetate which is in the mixture with the acetone and the swelling agent is dioxane or dimethylsulfoxide.

25. A process in accordance with claim 1 wherein the ratio of acetone to said solvent for cellulose triacetate is no more than 17.5:1.

26. A process in accordance with claim 25 wherein said ratio of acetone to solvent is 1.25:1 to 3:1.

27. A process in accordance with claim 1 wherein said swelling agent is formamide.

28. A process in accordance with claim 27 wherein the concentration of said formamide in the solution is 8-12%.

29. A process in accordance with claim 1 wherein the length of time of said exposing step is 2-30 seconds and further including the step of drying the formed membrane immediately following said precipitating step.

30. A process in accordance with claim 29 wherein the length of time of said exposing step is 5–15 seconds.

31. A process in accordance with claim 1 wherein the atmosphere above the membrane during casting is maintained partially saturated with solvent vapor.

32. A process in accordance with claim 1 further including the step of aging the solution prior to said casting step for 12–48 hours.

33. A process in accordance with claim 32 wherein said aging is for approximately one day.

34. An asymmetrical selectively permeable cellulose triacetate membrane prepared in accordance with the process of claim 1.

35. In the process of ultrafiltration of hyperfiltration using a selectively permeable membrane, the improvement wherein said membrane is the membrane of claim 34.

36. A process in accordance with claim 1 wherein said solvent for the cellulose triacetate which is in the mixture with the acetone is dimethylsulfoxide.

37. A process in accordance with claim 36 wherein said casting solution is prepared at a temperature of $-10°$ to $-40°$ C. and only 2 to 6% dimethylsulfoxide is used as said solvent for the cellulose triacetate, based on the total casting solution.

38. A process in accordance with claim 1, further including the step of drying the formed membrane following said precipitating step.

39. An asymmetrical selectively permeable cellulose triacetate membrane prepared in accordance with the process of claim 38.

40. In the process of ultrafiltration of hyperfiltration using a selectively permeable membrane, the improvement wherein said membrane is the membrane of claim 39.

* * * * *